Figure 1:
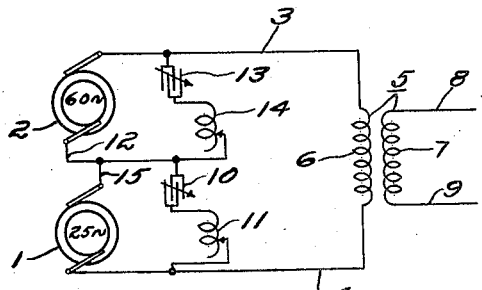

L. W. CHUBB.
DOUBLE FREQUENCY DISTRIBUTING SYSTEM.
APPLICATION FILED JAN. 10, 1917.

1,362,081.

Patented Dec. 14, 1920.
2 SHEETS—SHEET 1.

WITNESSES:
William Siler,
Geo. W. Hansen.

INVENTOR
Lewis W. Chubb
BY
Wesley G. Carr
ATTORNEY

L. W. CHUBB.
DOUBLE FREQUENCY DISTRIBUTING SYSTEM.
APPLICATION FILED JAN. 10, 1917.

1,362,081.

Patented Dec. 14, 1920.
2 SHEETS—SHEET 2.

WITNESSES:
William Siler,
Geo. W. Hansen.

INVENTOR
Lewis W. Chubb.
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

DOUBLE-FREQUENCY DISTRIBUTING SYSTEM.

1,362,081.  Specification of Letters Patent.  Patented Dec. 14, 1920.

Application filed January 10, 1917. Serial No. 141,616.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Double-Frequency Distributing Systems, of which the following is a specification.

My invention relates to electrical distributing systems, and it has special relation to alternating-current distributing systems which permit alternating currents of different frequencies to be distributed over common mains or conductors.

The overhead construction of a transmission line is governed by the electrical regulation desired and the mechanical strength necessary for supporting and retaining the transmission line intact. Assuming that it is desired to transmit electric power over a transmission line with a predetermined voltage drop, the amount of power to be delivered determines the value of the transmission voltage. In cases where the amount of power to be delivered is small, economy dictates that the voltage shall be relatively low, since the transmission conductors must be of sufficient size, in all events, to withstand the mechanical stresses and strains to which they will be subjected. For a given line loss, a relatively high current is permissible. Hence, it follows that the required voltage may be relatively low which effects considerable saving in supplying the insulators for properly insulating the line conductors.

If an equal amount of power at another frequency is to be distributed over the same area, a second transmission line having conductors of practically the same size and insulating strength is required. It is, therefore, evident that, if two such transmission lines are replaced by a single transmission line, such single line is of substantially the same size as each of those for which it is substituted. Moreover, the single line requires a small increase only in the insulation strength. By maintaining the different-frequency currents electrically independent of each other, the regulation of an alternating current of one frequency is not affected by that of the alternating currents of other frequencies. At the same time, the instantaneous voltage values may, under certain conditions, be substantially twice that obtaining in a single line transmitting alternating currents of one frequency only and at the same voltage. The root-mean-square voltages and currents are somewhat increased over those of a line transmitting alternating currents at a single frequency. The line losses obtaining in the system are the same as those obtaining in two lines but are all confined to a single line. Since the heating of a transmission line is not an important consideration for dictating its mechanical structure and arrangement, the size of the conductors need not be increased.

In an electric power installation, it is usual to have the transmission system cost from two to two and one-half times that of the generating equipment. Therefore, by confining two transmission systems that operate with currents of different frequencies, to a single line, such as is indicated above, a considerable saving is effected in the cost. Moreover, a single set of step-up and step-down transformers may be employed at both the power-generating and receiving ends of the transmission line which serve to transform simultaneously the voltages of the different-frequency currents.

Since the advantages accruing from the use of such combined transmission line are apparent, it is desirable to provide means whereby such a system may be employed while the different devices adapted to operate with alternating currents of selected frequencies are maintained electrically independent of one another. To this end, therefore, I have invented the distributing system herein disclosed.

Figure 2:
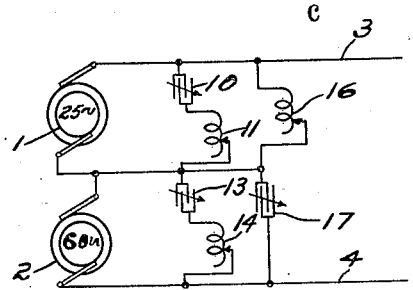
Figure 3:
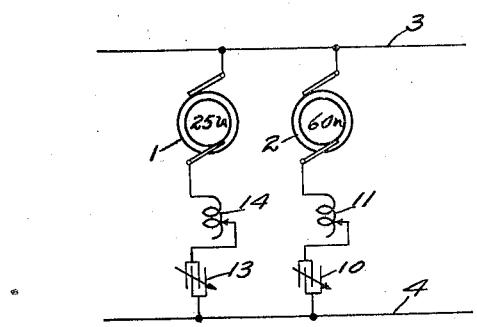
Figure 4:
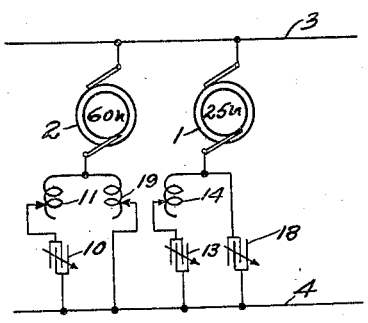
Figure 5:
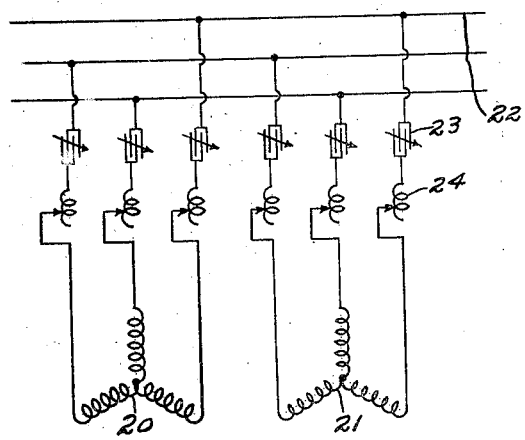
Figure 6:
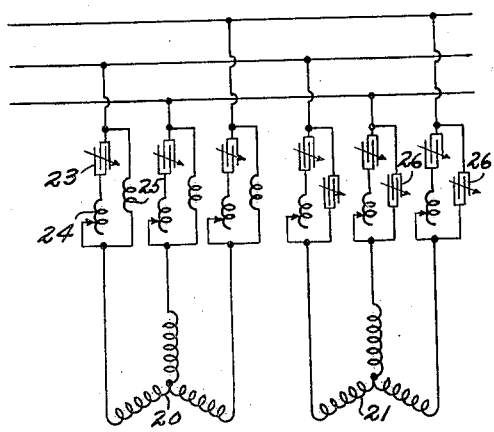
Figure 7:
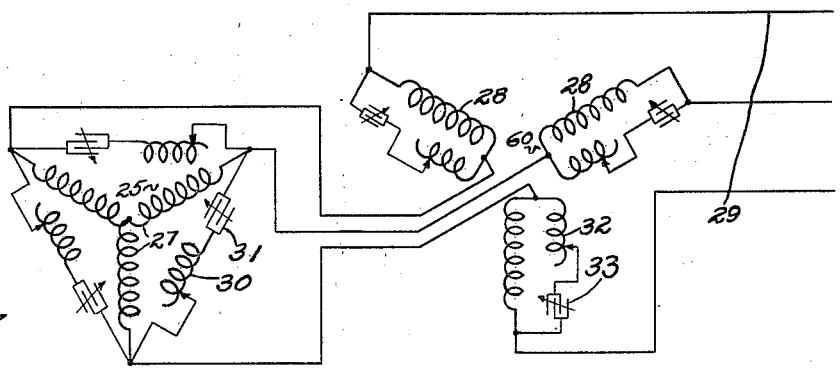
Figure 8:
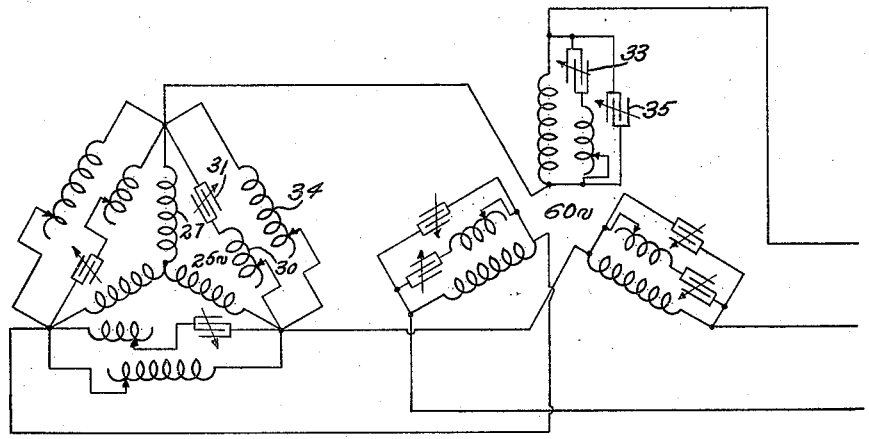

For a better understanding of the nature and scope of the present invention, reference may be had to the following description and the accompanying drawings in which Figure 1 is a diagrammatic representation of a distributing system in which two power sources, developing alternating currents of different frequencies, are connected to common distributing mains; Figs. 2, 3 and 4 are modifications of the system shown in Fig. 1; Fig. 5 is a diagrammatic representation of a polyphase-distributing system arranged to conform to my invention; Fig. 6 is a modification of the system shown in Fig. 5; Fig. 7 is a diagram of a distributing system embodying a form of my invention in which the power sources of different frequencies are connected in series relationship with one another, and Fig. 8 is a modification of the system of Fig. 7.

Referring to Fig. 1, an alternator 1 and an alternator 2, severally generating alternating currents of different frequencies, are connected to mains 3 and 4. A step-up transformer 5 has its primary winding 6 connected across the mains 3 and 4 and its secondary winding 7 connected to transmission conductors 8 and 9.

For illustration, it may be assumed that the alternator 1 is a twenty-five-cycle generator and the alternator 2 is a sixty-cycle generator, these two frequencies being selected for illustration because they are usual in commercial installations. It is important to maintain the alternators 1 and 2 electrically independent of each other whereby the regulation of one may be unaffected by that of the other. To this end, a condensive-reactive element 10 and an inductive reactive element 11 are connected in series relationship between a terminal 12 of the alternator 2 and the line conductor 4. The electrical constants of the elements 10 and 11 are so selected that the lead 12 offers a path which is non-reactive only to the flow of the alternating currents generated in the alternator 2. In the same manner, a condensive-reactance element 13 and an inductive-reactance element 14 are connected in series circuit between a terminal 15 of the alternator 1 and the conductor 3. The electrical constants of the elements 13 and 14 are so adjusted that a non-reactive path is provided only for the alternating currents generated in the alternator 1.

From the foregoing, it is apparent that the alternators 1 and 2 are severally electrically independent, while common conductors 3 and 4, as well as common transmission conductors 8 and 9, are employed for simultaneously transmitting alternating currents of both twenty-five and sixty cycles.

While the elements 10 and 11 of Fig. 1 provide a series resonant circuit for sixty-cycle alternating currents, they, of themselves, do not offer a prohibitive impedance to twenty-five-cycle alternating currents. Since the elements 10 and 11 are connected in shunt relationship to the generator 1, some twenty-five-cycle current will traverse this shunt circuit unless provision is made for preventing such current from flowing therethrough.

The series resonant circuit comprising the elements 10 and 11, when impressed with twenty-five-cycle current, possesses a capacity characteristic, since the reactance offered by the condenser 10 predominates over the reactance offered by the inductive element 11. As shown in Fig. 2, an inductive reactance element 16 is, therefore, connected in shunt to the elements 10 and 11, and its electrical constants are so adjusted that the elements 10 and 11, in combination with the inductive-reactance element 15, form an anti-resonant circuit for twenty-five-cycle currents. In other words, twenty-five-cycle currents are prevented from circulating through the shunt paths comprising the elements 10, 11 and 16 and the alternator 1.

In the same manner, the shunt circuit comprising the elements 13 and 14 constitutes a path for the non-reactive flow of twenty-five-cycle currents, but, being connected in shunt to the alternator 2 which develops sixty-cycle currents, permits some sixty-cycle current to flow therethrough, since these elements, of themselves, do not offer a prohibitively high impedance to sixty-cycle impulses. The circuit comprising the elements 13 and 14 possesses inductive characteristics when impressed with sixty-cycle currents. The condensive element 17 is, therefore, connected in shunt to the elements 13 and 14 and its electrical constants are so adjusted that an anti-resonant path, in shunt to the alternator 2, is established for sixty-cycle alternating currents. As a result, the two alternators 1 and 2 are maintained electrically independent of each other while, at the same time, they simultaneously impress alternating-currents of different frequencies upon the distributing conductors 3 and 4.

In Fig. 3, the alternators 1 and 2 are connected in shunt relationship to the conductors 3 and 4. In one of the leads of the alternator 1, the elements 13 and 14 are inserted which, as mentioned above, provide a series resonant path for twenty-five-cycle alternating currents or those developed by the alternator 1. In the same manner, the elements 10 and 11 are connected in one of the leads of the alternator 2 in order to provide a series resonant path for sixty-cycle alternating currents or those developed by the generator 2.

In Fig. 4, a condensive-reactance element 18 is connected in shunt to the elements 13 and 14, and its electrical constants are so adjusted that an anti-resonant circuit for sixty-cycle alternating currents is established. This follows from the fact that the circuit comprising the elements 13 and 14 possesses inductive characteristics when impressed with sixty-cycle impulses. The condensive element 18 is, therefore, employed to establish parallel resonance in the local circuit comprising the elements 13, 14 and 18 for sixty-cycle alternating currents. Similarly, the elements 10 and 11 are shunted by an inductive-reactance element 19 the electrical constant of which are adjusted to establish an anti-resonant circuit for twenty-five-cycle alternating currents.

In Fig. 5, I have shown a plurality of polyphase windings 20 and 21 connected to common distributing mains 22. In order to maintain the several groups of windings electrically independent, I have inserted condensive and reactance elements 23 and 24 in each lead connecting the windings and the distributing conductors. The constants of the elements 23 and 24 are so adjusted that alternating currents having only the frequency of those developed in the associated windings may flow non-reactively therethrough.

In Fig. 6, each group of windings 20 and 21 is severally protected against the flow of alternating currents having the frequency of those developed in the other group of windings by combining inductive-reactance elements 25 and condensive-reactance elements 26 with the proper groups comprising the elements 23 and 24 in order to establish anti-resonant paths for the alternating currents not developed in the associated windings.

Referring to Fig. 7, I have shown a group of star-connected windings 27 and a group of windings 28 connected to common distributing mains 29. For convenience, assume that the group of windings 27, forming the inner group of the combination, has twenty-five-cycle alternating currents impressed thereupon and the group of windings 28, forming the outer group of the combination, has sixty-cycle alternating currents impressed thereupon. The windings 27 are connected in shunt to circuits comprising inductive-reactance elements 30 and condensive-reactance elements 31. The circuits thus formed and connected across the terminals of the star-connected windings 27 are tuned to the frequency of the currents obtaining in the windings 28, in this instance, to sixty-cycle alternating currents. The series resonant paths for sixty-cycle currents thus established through the elements 30 and 31 serve as a common neutral point for the start-connected windings 28. At the same time, these series resonant circuits offer a substantially high impedance to the flow therethrough of twenty-five-cycle alternating currents or those obtaining in the windings 27.

In a similar manner, the windings 28 forming the outer group of the combined windings are connected in shunt to tuned circuits comprising elements 32 and 33 which form series resonant circuits for twenty-five-cycle currents. The currents obtaining in the windings 27 are, therefore, shunted from the windings 28 since the circuits comprising the elements 32 and 33 offer paths for the non-reactive flow therethrough of twenty-five-cycle currents only. In consequence thereof, the two groups of windings are maintained electrically independent of each other and, at the same time, furnish alternating currents of different frequencies to the common distributing mains 29.

In Fig. 8, the elements 30 and 31 which are associated with the windings 27 are also connected in shunt to inductive elements 34. The circuits comprising the elements 30 and 31, of themselves, permit some twenty-five-cycle current to flow therethrough. To preclude any circulating currents from flowing through the windings 27, the inductive elements 34 are employed to render the circuits comprising the elements 30 and 31 anti-resonant to twenty-five-cycle currents. In consequence thereof, no local circulating twenty-five-cycle current may traverse the windings 27 by reason of the shunt circuits connected across the terminals of the windings.

In the same manner, the elements 32 and 33 which are associated with the windings 28 are combined with condensive-reactance elements 35 in order to provide anti-resonant paths to prohibit local circulating sixty-cycle circulating currents from traversing the windings 28. In this instance, the group of windings 27 and 28 are maintained electrically independent of each other while, at the same time, each winding is severally provided with a neutral point and also with means prohibiting the flow therethrough of circulating alternating currents having the frequency of those normally obtaining in the windings.

It is apparent that the receiving ends of the systems disclosed will be similarly provided with series resonant and parallel resonant circuits in order to segregate the translating devices that are adapted to operate at different frequencies. Since the translating devices are connected to the supply mains in the manner shown for connecting the power sources to the supply mains, I have deemed it unnecessary to further describe the operation of the system.

While I have shown and described several embodiments of my invention, it will be understood that many modifications may be made therein without departing from the spirit and scope of the appended claims.

I claim as my invention:

1. The combination with power-distributing mains, a plurality of power devices for alternating currents of different frequencies, and leads for severally connecting said power devices to common distributing mains, of means inserted in one of the leads of each power device for offering a non-reactive path for the flow of alternating currents having only the frequency of that obtaining in the associated power device and a highly reactive path for currents of other frequencies.

2. The combination with common power-distributing mains, a plurality of power devices for alternating currents of different frequencies, and leads for severally connecting said power devices to the common distributing mains, of condensive and inductive-reactance elements associated with each power device for forming series resonant paths through the separate power devices for alternating currents having only the frequency of those obtaining in the associated power device and anti-resonant paths for currents of other frequencies.

3. The combination with power-distributing mains, two power-sources for alternating currents of different frequencies, and leads for severally connecting said sources to the common distributing mains, of condensive and inductive-reactance elements associated with each power-source and forming a series resonant path through each separate source for alternating currents having only the frequency of those developed by the associated power-source and an anti-resonant path for alternating currents having the frequency of those currents developed by the other power-source.

4. The combination with power-distributing mains, two power-sources for alternating currents of different frequencies, and leads for severally connecting said sources to the common distributing mains, of condensive and inductive-reactance elements connected in series with each power-source to provide a path therethrough for the non-reactive flow of the alternating current generated thereby, and other reactive elements possessing the proper characteristics for rendering said first reactive elements anti-resonant to alternating currents generated by the other power-source.

5. The combination with polyphase power-distributing mains, two electrical devices for alternating currents of different frequencies and having windings adapted for star-connection, corresponding windings of both devices being connected in series with each other and to the common polyphase distributing mains, whereby the group of inner windings is connected to a common neutral point, of series resonant circuits tuned to the frequency of the alternating currents developed in the outer group of windings connected across the terminals of the inner group of windings to form a neutral point for said outer group of windings, and series resonant circuits tuned to the frequency of the alternating currents developed in the inner group of windings connected across the terminals of the outer group of windings.

6. The combination with polyphase power distributing mains, two electrical devices having a plurality of windings, said devices being severally impressed with alternating currents of different frequencies, corresponding windings of both devices being connected in series with each other and to the common polyphase distributing mains, of series resonant circuits tuned to the frequency of the alternating currents developed in the outer group of windings connected across the terminals of the inner group of windings, and series resonant circuits tuned to the frequency of the alternating currents developed in the inner group of windings connected across the terminals of the outer group of windings.

7. The combination with polyphase power-distributing mains, two electrical devices having a plurality of windings, said devices being severally impressed with alternating currents of different frequencies, corresponding windings of both devices being connected in series with each other and to the common polyphase distributing mains, of series resonant circuits tuned to the frequency of the alternating currents developed in the outer group of windings connected across the terminals of the inner group of windings, and series resonant circuits tuned to the frequency of the alternating currents developed in the inner group of windings connected across the terminals of the outer group of winding, of means for rendering said circuits anti-resonant to alternating currents having the frequency of those developed in the group of windings across which the associated tuned circuits are connected.

8. The combination with polyphase distributing mains, a plurality of electrical devices having a plurality of windings, the said devices being impressed with alternating currents of different frequencies, corresponding windings of said devices being connected in series with each other and to the common polyphase distributing mains, of means for permitting the alternating currents obtaining in each device to flow to said distributing mains without traversing the windings of the other devices.

9. The combination with polyphase-power distributing mains, two electrical devices for generating alternating currents of different frequencies and severally having windings adapted for star-connection, corresponding windings of both devices being connected in series with each other and to the common polyphase distributing mains, of condensive and inductive-reactance elements connected across the terminals of each of said windings, the electrical characteristics of said elements associated with the inner group of said windings being so adjusted that series resonant paths are provided for the non-reactive flow therethrough of alternating currents having the frequency of those developed in the outer group of windings, and the electrical characteristics of the elements associated with the outer group of said windings being so adjusted that series resonant paths are provided for the non-reactive flow therethrough of alternating currents having the frequency of those in the inner group of windings.

10. The combination with polyphase-power distributing mains, two electrical devices for alternating currents of different frequencies and having windings adapted for star-connection, corresponding windings of both devices being connected in series with each other and to the common polyphase distributing mains, of condensive and inductive-reactance elements connected across the terminals of each of said windings, the electrical characteristics of said elements associated with the inner group of said windings being so adjusted that series resonant paths are provided for the non-reactive flow therethrough of alternating currents having the frequency of those developed in the outer group of windings, and the electrical characteristics of the elements associated with the outer group of said windings being so adjusted that series resonant paths are provided for the non-reactive flow therethrough of alternating currents having the frequency of those developed in the inner group of windings, and additional elements having the proper electrical characteristics for rendering the aforementioned condensive and inductive-reactance elements anti-resonant to alternating currents having the frequencies of those developed in the group of windings across which the associated condensive and inductive elements are connected.

In testimony whereof, I have hereunto subscribed my name this 29th day of Dec., 1916.

LEWIS W. CHUBB.